United States Patent
Lee (10) Patent No.: US 10,393,189 B2
(45) Date of Patent: Aug. 27, 2019

(54) CLUTCH DISK FOR VEHICLE

(71) Applicant: Hyundai Motor Company, Seoul (KR)

(72) Inventor: Jae Beom Lee, Bongdong-eup (KR)

(73) Assignee: Hyundai Motor Company, Seoul (KR)

( * ) Notice: Subject to any disclaimer, the term of this patent is extended or adjusted under 35 U.S.C. 154(b) by 428 days.

(21) Appl. No.: 15/345,313

(22) Filed: Nov. 7, 2016

(65) Prior Publication Data

US 2017/0356503 A1    Dec. 14, 2017

(30) Foreign Application Priority Data

Jun. 13, 2016   (KR) .................... 10-2016-0073136

(51) Int. Cl.
| | | |
|---|---|---|
| *F16D 13/64* | (2006.01) | |
| *F16D 13/58* | (2006.01) | |
| *F16D 43/21* | (2006.01) | |

(52) U.S. Cl.
CPC .......... *F16D 13/646* (2013.01); *F16D 13/58* (2013.01); *F16D 13/64* (2013.01); *F16D 43/215* (2013.01); *F16D 2013/642* (2013.01); *F16D 2300/22* (2013.01)

(58) Field of Classification Search
None
See application file for complete search history.

(56) References Cited

U.S. PATENT DOCUMENTS

| | | | | |
|---|---|---|---|---|
| 2,571,879 | A * | 10/1951 | Hill ........................ | F16D 7/08 368/209 |
| 4,418,812 | A * | 12/1983 | Lech, Jr. ............ | F16F 15/1219 192/206 |
| 4,619,353 | A * | 10/1986 | Maeda ................... | F16D 13/71 192/70.18 |
| 4,911,278 | A * | 3/1990 | Kabayama ............. | F16D 13/68 192/207 |

FOREIGN PATENT DOCUMENTS

| | | | | |
|---|---|---|---|---|
| JP | H06-129444 | A | 5/1994 | |
| JP | H09-100844 | A | 4/1997 | |
| JP | 2010-203558 | A | 9/2010 | |
| KR | 10-2007-0025241 | A | 3/2007 | |
| KR | 10-2008-0049477 | A | 6/2008 | |
| KR | 1020080049477 | | * 6/2008 | ............ F16D 13/64 |

* cited by examiner

*Primary Examiner* — Jacob S. Scott
*Assistant Examiner* — Ryan P Dodd
(74) *Attorney, Agent, or Firm* — Morgan, Lewis & Bockius LLP (57) ABSTRACT

A clutch disk for a vehicle may include a hub plate mounted on a shaft to restrict a rotation of the shaft, a sub plate rotatably mounted on the shaft, a presser mounted on the hub plate to restrict a position of the presser and protruding from the hub plate toward the sub plate, and a wave spring positioned between the hub plate and the sub plate, mounted to allow at least a part of the wave spring to adhere to the sub plate, and formed with a flexion to change a spaced distance from the hub plate depending on a rotation direction of the hub plate to thereby change a point and a level pressed by the presser depending on a relative rotation between the hub plate and the sub plate.

7 Claims, 4 Drawing Sheets

CLUTCH DISK FOR VEHICLE

CROSS REFERENCE TO RELATED APPLICATION

The present application claims priority to Korean Patent Application No. 10-2016-0073136, filed Jun. 13, 2016, the entire contents of which is incorporated herein for all purposes by this reference.

BACKGROUND OF THE INVENTION

Field of the Invention

The present invention relates to a clutch disk for a vehicle, and more particularly, to a clutch disk mounted in a clutch device for controlling power of an engine.

Description of Related Art

A vehicle may be provided with a clutch device for transferring or controlling power of an engine. In particular, the clutch device may be provided with a clutch disk that may be engaged and disengaged, thereby controlling the power of the engine.

The clutch disk may be provided in various forms, and in particular, may be provided as a frictional clutch disk that may be engaged with a drive disk or an engine flywheel by a frictional force.

The frictional clutch disk is mounted on an input shaft of a transmission to be surface-attached (meaning surfaces are attached to each other) to the flywheel or the drive disk mounted on a power shaft of the engine, thereby forming a combination relationship with the flywheel or the drive disk by the frictional force and may include a hub plate mounted on the input shaft of the transmission so that a rotation of the hub plate is restricted, and a sub plate rotatably mounted on the input shaft of the transmission.

Meanwhile, the sub plate is rotatably mounted on the input shaft, but the hub plate may be mounted with restraint devices to restrict a rotation thereof. Further, the restraint devices may be provided to absorb a shock generated due to a sudden transfer of torque to the sub plate.

Therefore, when the clutch disk is changed from a disengaged state to an engaged state, the shock may be applied to the sub plate and a torsion angle may be generated between the plate and the hub plate. In this case, the clutch disk shows hysteresis characteristics for the generation of the torsion angle.

Due to the hysteresis characteristics, the shock applied to the clutch disk may be relieved or noise occurring by the shock may be reduced, and therefore it is important to appropriately form the hysteresis characteristics in designing the clutch disk.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a clutch disk increasing a reduction effect in shock and noise by effectively changing a hysteresis characteristic value in response to a size of a torsion angle and having improved durability.

According to various aspects of the present invention, a clutch disk for a vehicle may include a hub plate mounted on a shaft to restrict a rotation of the shaft, a sub plate rotatably mounted on the shaft, a presser mounted on the hub plate to restrict a position of the presser and protruding from the hub plate toward the sub plate, and a wave spring positioned between the hub plate and the sub plate, mounted to allow at least a part of the wave spring to adhere to the sub plate, and formed with a flexion to change a spaced distance from the hub plate depending on a rotation direction of the hub plate to thereby change a point and a level pressed by the presser depending on a relative rotation between the hub plate and the sub plate.

The wave spring may be provided as a ring shape in which an rising portion protruding from the sub plate toward the hub plate and a falling portion curved from the rising portion toward the sub plate are formed.

The wave spring may have the rising portions each provided at both sides of the falling portion.

The presser may be disposed facing the falling portion of the wave spring to press against at least one of the falling portion and a side part of the rising portion.

The wave spring may include the falling portion provided at a first side of the rising portion and a frictional portion, which adheres to an outer surface of the sub plate to generate a friction, provided at a second side of the rising portion.

The frictional portion may be provided with a flat frictional surface adhering to the sub plate.

The presser may be mounted on the hub plate for at least a part thereof to protrude toward the sub plate and may be provided with a rotation shaft formed in a radial direction of the hub plate.

The presser may be a roller or a ball rotatably mounted on the hub plate.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 1 to 4, a clutch disk for a vehicle according to various embodiments of the present invention includes a hub plate 110 mounted on a shaft 50 to restrict a rotation thereof, a sub plate 120 rotatably mounted on the shaft 50, a presser 200 mounted on the hub plate 110 to restrict a position of the presser 200 and protruding from the hub plate 110 toward the sub plate 120, and a wave spring 250 positioned between the hub plate 110 and the sub plate 120, mounted to allow at least a part of the wave spring 250 to adhere to the sub plate 120, and formed with a flexion to change a spaced distance from the hub plate 110 depending on a rotation direction of the hub plate 110 to thereby change a point and a level pressed by the presser 200 depending on a relative rotation between the hub plate 110 and the sub plate 120.

Describing in detail, the hub plate 110 is mounted on the shaft 50 to restrict the rotation thereof and the sub plate 120 is rotatably mounted on the shaft 50. The shaft 50 may be a driving shaft (crank shaft) of an engine or an input shaft of a transmission, but in various embodiments of the present invention, the shaft will be described as the input shaft of the transmission.

The clutch disk according to various embodiments of the present invention selectively controls power of the engine to be transferred to the transmission. In particular, the clutch disk is provided as a fractional clutch disk which is selectively surface-attached to a flywheel or a drive disk on an engine power shaft to maintain a combined state using a frictional force.

The input shaft 50 of the transmission is provided with the hub plate 110. In this case, the hub plate 110 and the input shaft 50 of the transmission may be provided to form a mutual spline combination so that the hub plate 110 is mounted to restrict the rotation thereof.

Therefore, the hub plate 110 is mounted on the input shaft 50 to restrict the rotation thereof and the sub plate 120 is mounted on the input shaft 50 but is mounted to relatively rotate to the input shaft 50.

In various embodiments, the sub plate 120 may be combined with the friction disk mounted to be surface-attached to the flywheel or the drive disk mounted on the driving shaft of the engine so that the mutual rotation with the friction disk is restricted. Further, when a torque is generated in the friction disk, the sub plate 120 also forms the relative rotation to the hub plate 110 by the torque.

As the sub plate 120 is mounted on the shaft 50 to relatively rotate to the hub plate 110 of which the rotation is restricted, when the torque is suddenly generated, the relative rotation of the sub plate 120 to the hub plate 110 may reduce the shock due to the generation of the torque and the occurrence of noise due to the shock.

Further, to absorb the shock, or the like and recover the sub plate 120 to an original position, a resistor, or the like, against the relative rotation of the sub plate 120 may be provided and a separate component to restrict a rotation range (maximum rotation angle) of the sub plate 120 may also be provided.

Figure 1:
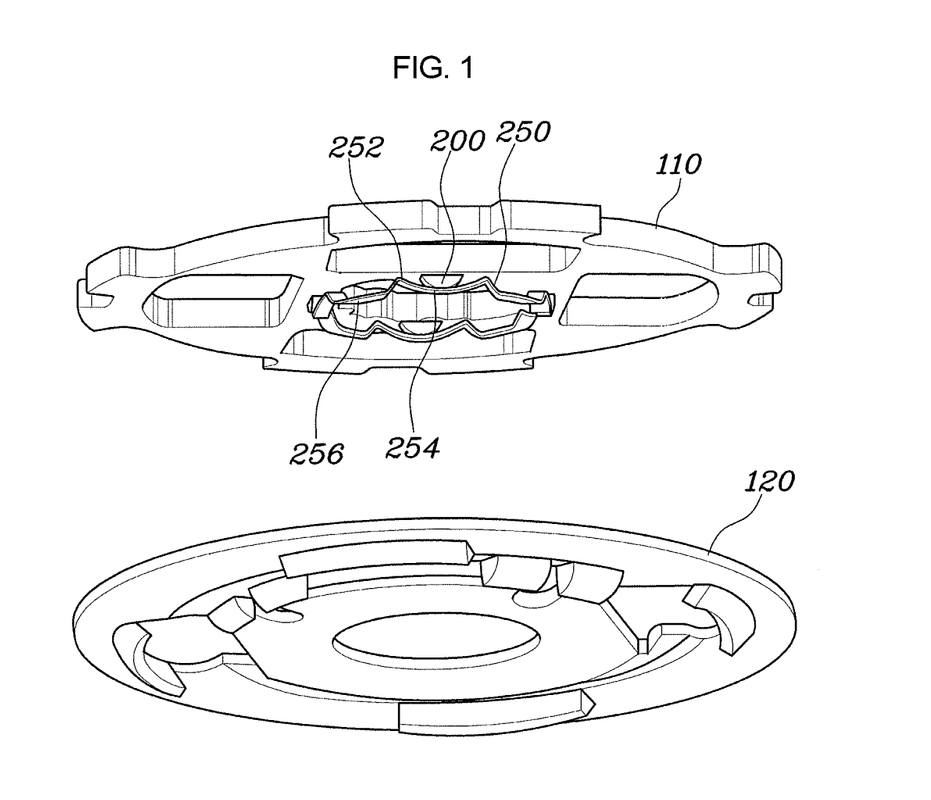
FIG. 1 is a diagram illustrating a hub plate and a sub plate disassembled from a clutch disk for a vehicle according to various embodiments of the present invention.
Figure 3:
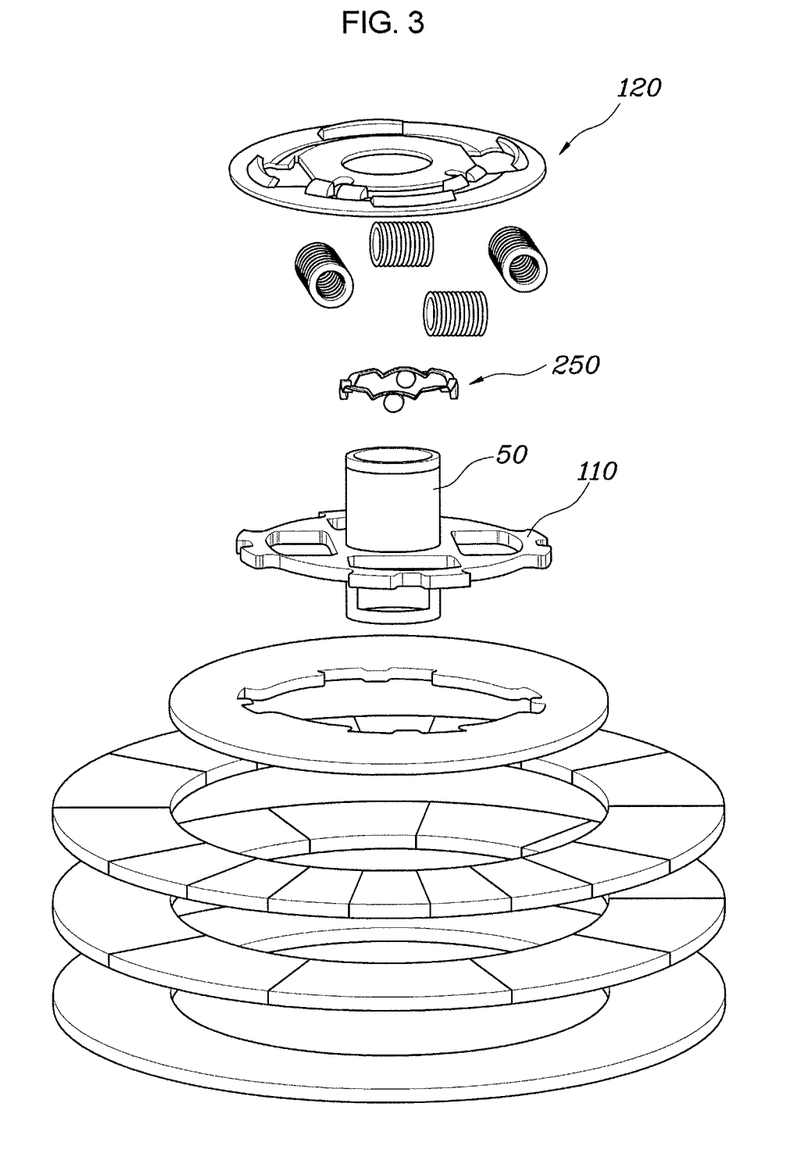
FIG. 3 is a diagram illustrating the clutch disk for a vehicle according to various embodiments of the present invention is disassembled.

An appearance of the hub plate 110 and the sub plate 120 is illustrated in FIG. 1 and a combination relationship among the friction disk, the hub plate 110, and the sub plate 120 is schematically illustrated in FIG. 3.

Meanwhile, the presser 200 is mounted on the hub plate 110 to restrict a position thereof and is mounted to protrude from the hub plate 110 toward the sub plate 120. In various embodiments, the presser 200 may be provided so that a part thereof is inserted into the hub plate 110 and the rest part protruded to the outside of the hub plate 110 and may be integrally provided with the hub plate 110.

Figure 2:
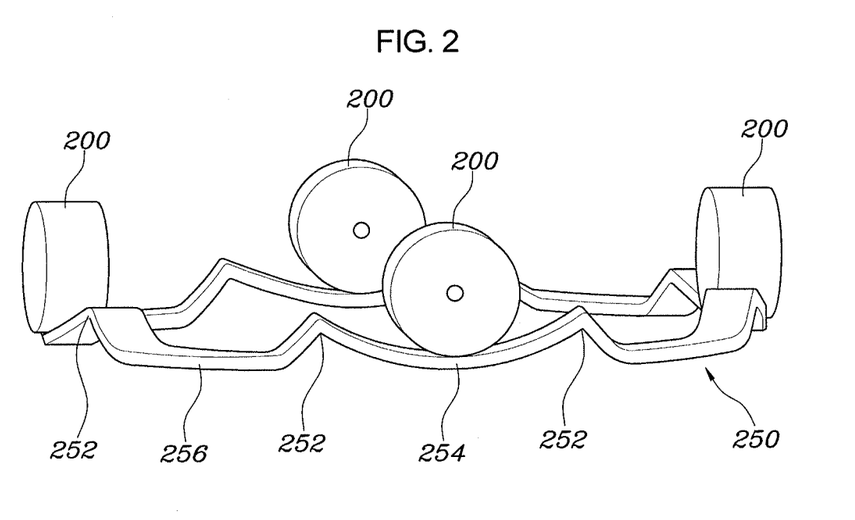
FIG. 2 is a diagram illustrating a presser and a wave spring in the clutch disk for a vehicle according to various embodiments of the present invention.

The presser 200 is provided in plural and may be disposed along a circumferential direction of the hub plate 110. The presser 200 serves as a means for pressing the wave spring 250 to be described below. FIG. 1 and FIG. 2 illustrate the presser 200.

Meanwhile, the wave spring 250 is positioned between the hub plate 110 and the sub plate 120, mounted so that at least a part thereof adheres to the sub plate 120, and formed with a flexion so that a spaced distance from the hub plate 110 is changed depending on a rotation direction of the hub plate 110, thereby changing the point and the level pressed by the presser 200 depending on the relative rotation between the hub plate 110 and the sub plate 120.

In detail, in various embodiments the wave spring 250 is made of an elastic body having a strong restoring force to an original form even when the wave spring 250 is deformed depending on the pressing by the presser 200 and is positioned between the hub plate 110 and the sub plate 120, in particular, provided to have at least a part adhere to the sub plate 120 to form a frictional force with the sub plate 120.

Further, the wave spring 250 is provided with the flexion along the rotation direction of the hub plate 110. Therefore, the spaced distance between the wave spring 250 and the hub plate 110 is changed depending on the rotation direction of the hub plate 110.

In various embodiments, the presser 200 mounted on the hub plate 110 is provided so that a protruding length thereof is fixed and the relative position to the hub plate 110 is fixed and as the wave spring 250 is provided in a curved shape, the pressed position of the sub plate 120 by the presser 200 is changed upon the relative rotation of the sub plate 120 to the hub plate 110.

Further, the spaced distance between the wave spring 250 and the hub plate 110 is changed depending on the rotation direction of the hub plate 110, and therefore if the wave spring 250 is relatively rotated to the hub plate 110 along with the rotation of the sub plate 120, the wave spring 250 changes the point pressed by the presser 200 and thus changes the pressed level.

In detail, if the wave spring 250 is rotated, the point facing the presser 200 is changed and the spaced distance from the hub plate 110 is also changed, and therefore the level pressed by the presser 200 having a predetermined protruding length is changed.

A frictional force formed between the wave spring 250 and the sub plate 120 is also changed in response to the level pressed by the presser 200. That is, as the spaced distance between the wave spring 250 and the hub plate 110 at the point pressed by the presser 200 is reduced, the level pressed by the presser 200 is increased and if the pressed level is increased, a vertical resistance force is increased between the wave spring 250 and the sub plate 120, such that the frictional force between the wave spring 250 and the sub plate 120 is increased.

Meanwhile, as described above, in various embodiments the wave spring 250 is provided to relatively rotate to the hub plate 110 along with the sub plate 120. For this purpose, the wave spring 250 is provided so that the frictional force formed between the wave spring 250 and the sub plate 120 is larger than that formed between the wave spring 250 and the hub plate 110 (in various embodiments, the presser 200).

This means that the frictional force formed between the sub plate 120 and the wave spring 250 needs to be larger than that formed between the presser 200 and the wave spring 250 (hindering the rotation of the wave spring 250 rotated along with the sub plate 120) in even the state in which the pressed level of the wave spring 250 by the presser 200 is lowest (state in which the spaced distance from the hub plate 110 at the pressed point is maximal).

By doing so, the wave spring 250 may be rotated along with the sub plate 120 while being pressed by the presser 200 and the level of the frictional force formed between the wave spring 250 and the sub plate 120 may also be changed while the point pressed by the presser 200 is changed.

If the wave spring 250 is provided in a flat shape, not a curved shape and thus is applied with a uniform pressing force at all times regardless of the torsion angle between the sub plate 120 and the hub plate 110, and therefore if the friction force formed between the wave spring 250 and the sub plate 120 is uniform at all times, the frictional force is uniformly formed between the wave spring 250 and the sub plate 120 at all times regardless of the torsion angle, such that the hysteresis characteristic value is constant at all times regardless of the torsion angle.

For example, according to various embodiments of the present invention even in the situation that the absorption of the shock is greatly required as the situation that the torsion generated in the clutch disk or the torsion angle generated on the hub plate 110 and the sub plate 120 is great, the hysteresis characteristic value at the clutch disk is constant, and therefore it is insufficient to relieve the shock and noise currently generated.

That is, if the torsion is generated at the clutch disk, changing the hysteresis characteristic value in response to the change in the torsion size has an advantage of flexibly coping with the shock and noise of the clutch disk in response to the change in the torsion size.

Therefore, various embodiments of the present invention includes the wave spring 250 as the frictional member between the hub plate 110 and the sub plate 120 to generate the hysteresis characteristics. In particular, the wave spring 250 is provided in the curved shape so that the spaced distance from the hub plate 110 is changed depending on the rotation direction of the hub plate 110, such that the level pressed by the presser 200 and the frictional force with the sub plate 120 are changed in response to the torsion angle to change the hysteresis characteristic value.

Figure 4:
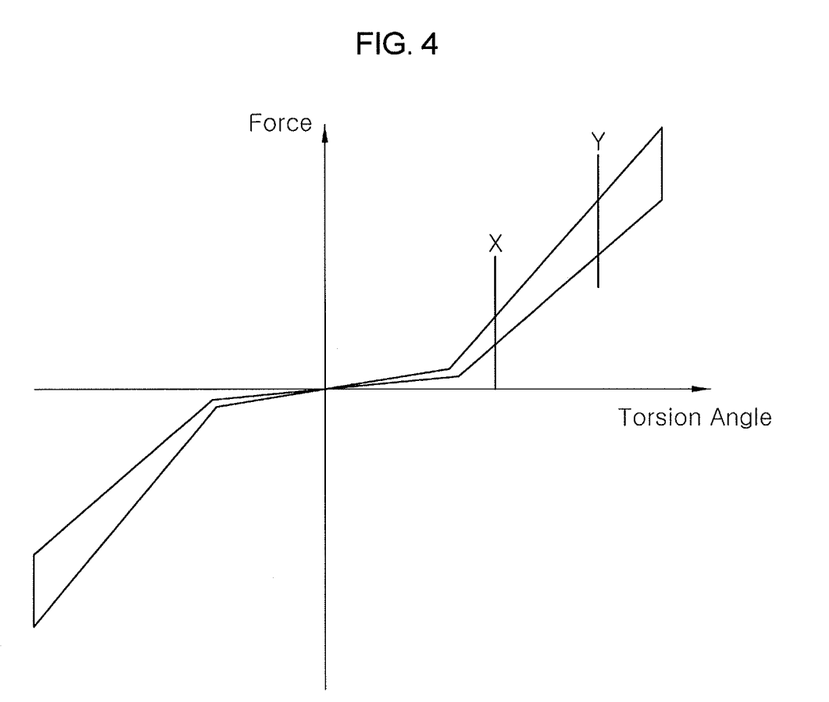
FIG. 4 is a graph illustrating hysteresis characteristics for the clutch disk for a vehicle according to various embodiments of the present invention.

FIG. 1 and FIG. 2 illustrate the wave spring 250 according to various embodiments of the present invention and FIG. 4 is a graph illustrating a change in a hysteresis characteristic value changed by the wave spring 250.

In FIG. 4, a horizontal axis represents the torsion angle and a vertical axis represents a torque applied to the clutch disk. Further, a difference value between two torque points positioned at one point of the same horizontal axis in the graph of FIG. 4 represents the hysteresis characteristic value of various embodiments of the present invention. That is, FIG. 4 illustrates an example in which the larger the torsion angle, the larger the hysteresis characteristic value, which may be confirmed by comparing an X state and a Y state of FIG. 4.

Meanwhile, as illustrated in FIGS. 1 and 2, in the clutch disk for a vehicle according to various embodiments of the present invention, the wave spring 250 is provided as a ring shape in which a rising portion 252 protruding from the sub plate 120 toward the hub plate 110 and a falling portion 254 curved from the rising portion 252 toward the sub plate 120 are formed.

In detail, as described above, in various embodiments at least a part of the wave spring 250 is provided to adhere to the sub plate 120. According to various embodiments of the present invention, a reference position for the rising of the wave spring 250 corresponds to one surface of the sub plate 120 adhering to the wave spring 250 and is represented as the rising and the protrusion in various embodiments of the present invention when the wave spring 250 is extended from the sub plate 120 toward the hub plate 110.

That is, in the clutch disk for a vehicle according to various embodiments of the present invention, the wave spring 250 is provided with the rising portion 252 that rises from the sub plate 120 to protrude toward the hub plate 110 and is provided with the falling portion 254 that falls while being extended from the rising portion 252, along a circumferential direction of the hub plate 110 to have a shape curved to the hub plate 110.

The rising portion 252 and the falling portion 254 are provided in plural and thus the rising and falling of the wave spring 250 are repeated plural times, such that the wave spring 250 has a curved shape in which the spaced distance from the hub plate 110 is changed.

The wave spring 250 is provided as a circular ring or a ring shape that forms a closed curve. If the torque of the engine is transferred to the sub plate 120 by the combination of the clutch disk and the flywheel, or the like, the torsion angle of the sub plate 120 to the hub plate 110 is formed, the wave spring 250 is rotated along with the sub plate 120.

Compared to the case in which the rising portion 252 is pressed, in the case in which the falling portion 254 of the wave spring 250 is pressed by the presser 200 of the wave spring 250, the pressed level is lower and the frictional force is small, such that the hysteresis characteristic value is relatively small. On the contrary, compared to the case in which the falling portion 254 is pressed, in the case in which the rising portion 252 is pressed by the presser 200, the level pressed by the presser 200 is increased, and therefore the frictional force for the sub plate 120 is increased and the hysteresis characteristic value is also relatively increased.

Meanwhile, as illustrated in FIGS. 1 and 2, in the clutch disk for a vehicle according to various embodiments of the present invention, the wave spring 250 has the rising portions 252 each provided at both sides of the falling portion 254.

In detail, compared to the rising portion 252, the falling portion 254 has a longer spaced distance from the hub plate 110 and a shorter spaced distance from the sub plate 120 and the rising portions 252 are positioned at both sides of the falling portion 254 to increase and decrease the frictional force in response to the change in the torsion angle. Further, according to various embodiments of the present invention, it may be understood that both sides of the falling portion 254 represent one rotation direction and the other rotation direction with respect to the circumferential direction of the wave spring 250.

That is, even when the torsion angle is not only generated in the one rotation direction but is also generated in the other rotation direction, the frictional force for the sub plate 120 is changed and thus when the torsion angle is changed, the hysteresis characteristic value may be changed at all times.

FIG. 1 and FIG. 2 illustrates an appearance that the rising portions 252 are positioned at both sides of any one falling portion 254 as described above.

Meanwhile, as illustrated in FIGS. 1, 2, and 4, in the clutch disk for a vehicle according to various embodiments of the present invention, the presser 200 is provided to face the falling portion 254 of the wave spring 250 to press the falling portion 254 or the side part of the rising portion 252.

In detail, in the situation that the torsion angle is not generated, the presser 200 fixed to the hub plate 110 that may be understood as a fixed body in various embodiments of the present invention is positioned to press the falling portion 254 while facing the falling portion 254 of the wave spring 250.

That is, in various embodiments in the situation that the torsion angle is 0, the presser 200 is provided to press a central part of the falling portion 254, such that the frictional force between the sub plate 120 and the wave spring 250 has a lowest value.

Meanwhile, if the torsion angle is increased, the wave spring 250 is rotated and a height rising to the hub plate 110 is changed while the point facing the presser 200 is changed. In particular, in various embodiments of the present invention, the pressed point moves from the falling portion 254 to the rising portion 252 and the level pressed by the presser 200 is increased while the rising height to the hub plate 110 of the wave spring 250 is increased (while the spaced distance from the hub plate 110 is reduced), and thus the frictional force is gradually increased.

Further, the rising portions 252 of both sides of the falling portion 254 may also be understood as a means for limiting a range in which the wave spring 250 is rotated by the increase in the torsion angle to move the point pressed by the presser 200 from the falling portion 254.

That is, according to various embodiments of the present invention, as the torsion angle is increased, the pressed level of the wave spring 250 by the presser 200 is increased and as the torsion angle is increased, the frictional force applied to the sub plate 120 is increased and thus the hysteresis characteristic value is increased.

FIG. 1 and FIG. 2 illustrates the appearance that the falling portion 254 of the wave spring 250 is provided with the point pressed by the presser 200 as the situation that the torsion angle is not generated and the rising portions 252 are formed at both sides of the falling portion 254 and FIG. 4 illustrates as a graph the appearance that the hysteresis characteristic value is increased when the torsion angle is increased by the exemplary embodiment. In FIG. 4, as the situation that a Y state has the torsion angle larger than an X state, the hysteresis characteristic value is also increased.

Therefore, in the situation that the torque transferred from the engine is large and thus the occurrence level of the shock and noise is also increased, the clutch disk according to various embodiments of the present invention has also the increased hysteresis characteristic value, and therefore it is advantageous to completely relieve the increased shock and noise.

Meanwhile, as illustrated in FIGS. 1 and 2, in the clutch disk for a vehicle according to various embodiments of the present invention, the wave spring 250 has the falling portion 254 provided at one side of the rising portion 252 and a frictional portion 256, which adheres to an outer surface of the sub plate 120 to generate a friction, provided at the other side of the rising portion 252.

As described above, according to various embodiments of the present invention, the rising portions 252 are positioned at both sides of the falling portion 254. On the other hand, mainly reviewing the rising portion 252, one side of the rising portion 252 is provided with the falling portion 254 and the other side thereof is provided with the frictional portion 256.

That is, reviewing the wave spring 250 depending on one rotation direction with respect to the falling portion 254, the falling portion 254, the rising portion 252, the frictional portion 256, the rising portion 252, and the falling portion 254 may be disposed in order. Differently describing it, the rising portions 252 are provided at both sides of the frictional portion 256.

The frictional portion 256 adheres to one surface of the sub plate 120 to generate a frictional force. The change in the frictional force of the frictional portion 256 as the change in the pressed portion to the falling portion 254 and the rising portion 252 will be described as follows.

First, in the situation that the presser 200 according to various embodiments of the present invention presses against the falling portion 254, the pressure applied to the falling portion 254 is transferred to the frictional portion 256 to generate a normal force between the frictional portion 256 and one surface of the sub plate 120, and therefore the frictional force is present.

Meanwhile, if the torsion angle is increased, and thus the point pressed against by the presser 200 gradually moves from the falling portion 254 to the rising portion 252, the pressure by the presser 200 is gradually increased and the increase in the pressure is transferred to the frictional portion 256 to increase the normal force generated between the frictional portion 256 and one surface of the sub plate 120. Therefore, the frictional force applied to the sub plate 120 is also increased.

That is, according to various embodiments of the present invention, the wave spring 250 is provided to change the height rising from the sub plate 120 so that the level pressed by the presser 200 is changed in response to the change in the torsion angle and thus the frictional force applied to the sub plate 120 may be changed and a part of the wave spring 250 adheres to the sub plate 120 and thus the frictional portion 256 adhering to the sub plate 120 is provided so that the frictional force may always be formed in the relationship with the sub plate 120.

Therefore, the pressure increased in response to the increase in the torsion angle is transferred to the frictional portion, and the pressure is changing to the frictional force and the hysteresis characteristic value of the clutch disk according to various embodiments of the present invention may be increased in response to the increase in the torsion angle.

FIG. 1 and FIG. 2 illustrate the appearance of the wave spring 250 in which the rising portions 252 are provided at both sides of the frictional portion 256 and one side of the rising portion 252 is provided with the falling portion 254 and the other side thereof is provided with the frictional portion 256.

Meanwhile, as illustrated in FIGS. 1 and 2, in the clutch disk for a vehicle according to various embodiments of the present invention, the frictional portion 256 is provided with a flat frictional surface adhering to the sub plate 120.

In detail, the frictional surface adheres to one surface of the sub plate 120 and may be made of the same material as the wave spring 250 or may be made of a different material therefrom, and the frictional portion 256 is integrally or monolithically formed with the wave spring 250 and may be provided in a shape in which the frictional surface is coated with a separate frictional material, and therefore may have various shapes and may be made of various materials.

As described above, in various embodiments the wave spring 250 is provided to form the frictional force between the wave spring 250 and the sub plate 120, not between the wave spring 250 and the hub plate 110. For this purpose, the wave spring 250 is provided with, in particular, the frictional surface adhering to the sub plate 120.

By doing so, in the situation that the wave spring 250 is pressed by the presser 200, the wave spring 250 may form the frictional force between the wave spring 250 and the sub plate 120 through the frictional surface. FIG. 1 and FIG. 2 illustrate the appearance that the frictional portion 256 is provided with the frictional surface as a flat surface adhering to the sub plate 120.

Meanwhile, as illustrated in FIGS. 1 and 2, in the clutch disk for a vehicle according to various embodiments of the present invention, the presser 200 is mounted on the hub plate 110 so that at least a part thereof protrudes toward the sub plate 120 and is provided with a rotation shaft formed in a radial direction of the hub plate 110.

As described above, the operation of various embodiments of the present invention permits the relative rotation of the wave spring 250 to the hub plate 110 under a predetermined level and the wave spring 250 is provided to form the frictional force changed in response to the change in the torsion angle between the wave spring 250 and the sub plate 120, such that the hysteresis characteristic value is changed in response to the torsion angle upon the relative rotation of the sub plate 120.

Therefore, according to various embodiments of the present invention, to minimize the rotation resistance between the presser 200 fixed to the hub plate 110 and the wave spring 250, the presser 200 is provided as a rotating body.

According to various embodiments of the present invention, the presser 200 is mounted so that a part thereof is inserted into the hub plate 110 and the rest part thereof protrudes toward the sub plate 120. In particular, the presser 200 has the rotation shaft fixed to the hub plate 110 and the rotation shaft is formed in parallel with the radial direction of the hub plate 110 so that the rotation body has the rotation direction in a direction parallel with the rotation direction of the hub plate 110.

That is, upon the relative rotation of the wave spring 250 and the sub plate 120 with respect to the hub plate 110, the presser 200 is provided as the rotating body rotated along with the rotation of the wave spring 250 to minimize the generation of the frictional force in the relationship with the wave spring 250 without hindering the pressing action.

FIG. 1 and FIG. 2 illustrate the appearance that as described above, the presser 200 is provided as the rotation body mounted on the hub plate 110.

Meanwhile, as illustrated in FIGS. 1 and 2, in the clutch disk for a vehicle according to various embodiments of the present invention, the presser 200 is provided as the roller or the ball rotatably mounted on the hub plate 110.

FIG. 1 and FIG. 2 illustrate the appearance that the presser 200 is provided as the roller. Therefore, the presser 200 is provided to minimize the formation of the frictional force in the relationship with the wave spring 250 and completely perform the pressing function.

According to the clutch disk for the vehicle having the structure as described above, it is possible to provide the clutch disk increasing the reduction effect in shock and noise by effectively changing the hysteresis characteristic value in response to the size of the torsion angle and having the improved durability.

In particular, the wave spring is provided between the sub plate and the hub plate and the wave spring is provided in the curved shape to change a spaced distance from the hub plate along a circumferential direction to thereby change the point and the level pressed by the presser of the hub plate upon the generation of the torsion, such that the hysteresis characteristics may be changed in response to the torsion angle.

Further, the presser of the sub plate may be provided to face a falling portion of the wave spring to press the falling portion and press the side part of the rising portion from the central part of the falling portion upon the occurrence of the torsion to thereby increase the frictional force by the wave spring upon the increase in the torsion angle, such that the effect of the shock absorption and the noise reduction may be improved.

Meanwhile, the presser may be provided as the roller or the ball inserted into the hub plate to minimize the frictional force between the presser and the wave spring, such that the pressed point by the presser may be effectively changed.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A clutch disk for a vehicle, the clutch disk comprising:
   a hub plate mounted on a shaft to restrict a rotation of the shaft;
   a sub plate rotatably mounted on the shaft;
   a presser mounted on the hub plate to restrict a position of the presser and protruding from the hub plate toward the sub plate; and
   a wave spring positioned between the hub plate and the sub plate, mounted to allow at least a part of the wave spring to adhere to the sub plate, and formed with a flexion to change a spaced distance from the hub plate to the wave spring depending on a rotation amount of the hub plate to thereby apply variable pressure of the presser to the wave spring depending on a relative rotation between the hub plate and the sub plate,
   wherein the wave spring is formed in annular shape including a rising portion protruding from the sub plate toward the hub plate and a falling portion curved from the rising portion toward the sub plate in a circumferential direction of the wave spring.

2. The clutch disk for the vehicle of claim 1, wherein the wave spring has rising portions each provided at both sides of the falling portion.

3. The clutch disk for the vehicle of claim 1, wherein the presser is disposed facing the falling portion of the wave spring to press against at least one of the falling portion and a side part of the rising portion.

4. The clutch disk for the vehicle of claim 1, wherein the wave spring includes the falling portion provided at a first side of the rising portion and a frictional portion, which adheres to an outer surface of the sub plate to generate a friction, provided at a second side of the rising portion.

5. The clutch disk for the vehicle of claim 4, wherein the frictional portion is provided with a flat frictional surface adhering to the sub plate.

6. The clutch disk for the vehicle of claim 1, wherein the presser is mounted on the hub plate for at least a part thereof to protrude toward the sub plate and to have a rotation axis in a radial direction of the hub plate.

7. The clutch disk for the vehicle of claim 6, wherein the presser comprises a roller or a ball rotatably mounted on the hub plate.

* * * * *